Nov. 12, 1935.  H. E. PUMPHREY  2,020,573
HEADREST FOR SEAT BACKS
Filed Nov. 27, 1934
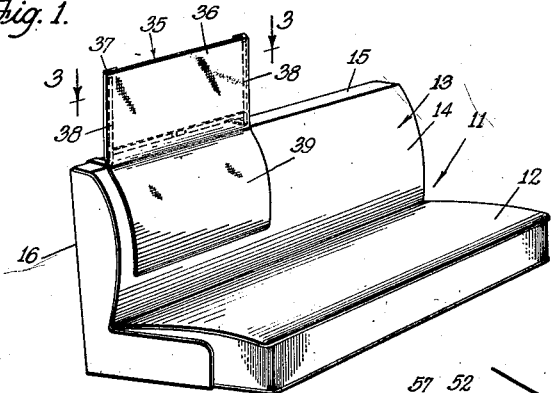
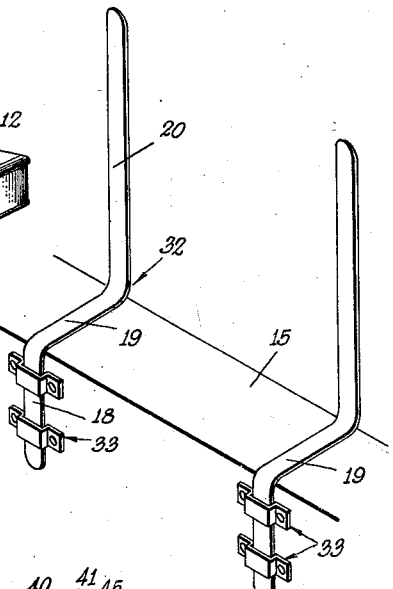
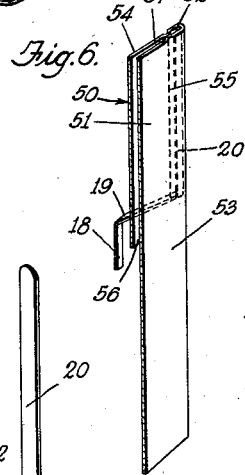
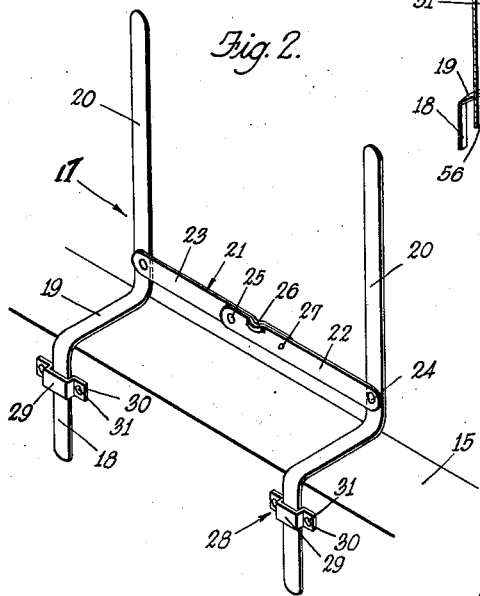
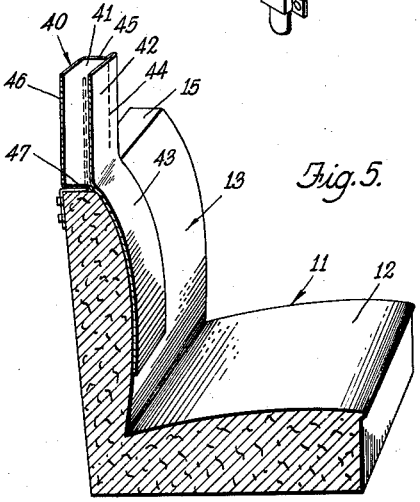
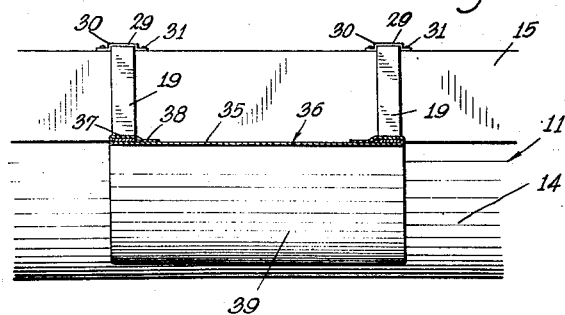
*Inventor*
*H.E.Pumphrey*
*by Hazard and Miller*
*Attorneys.*

Patented Nov. 12, 1935

2,020,573

UNITED STATES PATENT OFFICE 2,020,573

HEADREST FOR SEAT BACKS

Harry E. Pumphrey, Pasadena, Calif.

Application November 27, 1934, Serial No. 754,963

7 Claims. (Cl. 155—173)

My invention relates to a headrest which may be attached to a seat of an automobile and extending above the top of the seat affords a device against which a person may recline the head.

The present invention may be considered as a further development of my patent application for Headrest for motor vehicles, filed July 13, 1934, Serial No. 734,934, matured to Patent 2,001,396, dated May 14, 1935. In the invention of this application one of the objects and features thereof is the provision of a pair of posts or similar structures which may be attached to a seat back and extend above the top or upper edge thereof. These posts form a support for a fabric structure which may extend between the posts and thus form a headrest. With this fabric headrest I preferably use a fabric flap which spreads over the back of the seat and thus when a person leans against the flap the post and the fabric headrest are retained in their proper position in relation to the top of the seat. In the simple form of headrest a strip of fabric is provided with pockets at its opposite ends and the posts extend upwardly through the pockets. These posts position the fabric headrest above and toward the front edge of the top of the seat back in a position whereby a person may, in an automobile, sit upright and have the head supported so that he can readily look forward in the direction of travel.

Another object and feature of my invention is making the fabric headrest structure in the form of a sack, such sack having a front and a rear side, two lateral edges, and preferably a bottom, open at the top so that a pillow or the like may be inserted in the sack to make a softer headrest. This sack is held by the pockets at its marginal edges fitting over the posts attached to the seat back, and the bottom of the sack preferably rests on the top edge of the back of the seat. In this case the flap extends downwardly over the back of the seat against which the person leans using the headrest.

Another object and feature of my invention is in the manner of constructing and supporting the post bracket. These are preferably made of spring metal bent into a so-called Z-shape, in which the lower section of the post brackets fit into sockets or behind straps on the back of the seat, an intermediate horizontal section at substantially right angles thereto extends over and rests on the upper edge of the seat back and the posts extend upwardly and are substantially parallel to the lower sections, being offset by the intermediate horizontal section on the edge of the seat back and parallel thereto. This construction bring the posts adjacent the front edge of the seat back. The posts may be spaced apart by a folding brace or the sockets may be sufficient to secure the posts in position.

My invention is illustrated in the accompanying drawing, in which:

Fig. 1 is a perspective view showing one form of my invention as applied to an automobile seat back.

Fig. 2 is a perspective view of one form of post brackets having the spacing brace.

Fig. 3 is a horizontal section on the line 3—3 of Fig. 1 in the direction of the arrows.

Fig. 4 is a perspective view of another form of post brackets held in place by sockets or socket straps on the back of the seat.

Fig. 5 is a perspective view of another form of my invention in which a sack is provided to rest on the upper edge of the seat back.

Fig. 6 is a sectional perspective view showing a modified form of headrest.

In the drawing a seat, such as used for the front seat of automobiles, is indicated by the numeral 11. This has the seat proper 12 and the seat back 13. This seat back has a front portion 14, a top edge 15, and a rear side 16.

The post bracket is illustrated in Fig. 2 and designated by the numeral 17. There are two post brackets 17 each formed of spring metal and have each a lower section 18 adapted to fit against the rear side of the seat back, an intermediate horizontal section 19 bent substantially at right angles to the lower section 18 and adapted to rest on the upper edge of the seat back. The posts 20 extend vertically from the forward end of the intermediate horizontal section and are substantially in alignment with the front of the seat back and parallel to the lower sections 18. The posts 20 are connected together by a spacing brace 21 which has two links 22 and 23, each pivoted as indicated at 24 to one of the posts 20 and pivoted together as indicated at 25. The bent off sections 26 and the nub and socket 27 allows the links of the brace to come into alignment or to allow folding in one direction only and thus when they are in alignment the offset sections 26 interlock as do the nubs and sockets 27 forming a rigid brace.

With this construction I use socket devices 28 which are in the form of metal straps 29 bent U-shaped and having ends 30 secured by screws 31 or the like to the rear side of a seat back. The lower ends 18 of the post brackets may be inserted between the offset portion of these straps and the rear face 16 of the seat back. In this manner the post brackets may be supported on the seat back and only one strap socket for each post bracket is required.

In the construction of Fig. 4 each post bracket 32 has a lower section 18, an intermediate horizontal section 19, and a post 20 similar to that described in connection with Fig. 2 but there is no brace between the two posts. However, in this case I use double sockets 33 which are formed of straps similar to the strap brackets illustrated in Fig. 2. With two of these used for each lower section 18 each post bracket is held rigidly in position and it is not necessary to have the cross brace 21.

With either of the constructions above mentioned or with the clamping type of post support described in my patent application above mentioned I use a fabric or similar headrest strip 35. This has a center portion 36 and marginal pockets 37, the pockets being formed by a line of stitching 38. A flap 39 extends downwardly from the portion 36 against which the head is intended to rest, and spreads over the back 14 of the seat whereby a person using the headrest leans against the flap 39. The posts 20 are inserted in the pockets 37. In this construction it will be seen that the headrest strip 36 is firmly held by the two posts and its lower edge engages the upper edge 15 of the seat back, the flap 39 extending from this upper edge downwardly over the back 14 of the seat.

In the construction illustrated in Fig. 5 the headrest portion 40 employs a sack construction 41 which has a front rest strip 42 with the flap 43 extending downwardly. This front portion 42 has end pockets 44. Constructed on the back of the headrest strip 42 there are marginal edge fabrics 45, a back fabric strip 46, a bottom strip 47, the sack thus formed being preferably open at the top for inserting of a pillow. Thus this sack supported by the posts rests on the upper edge of the seat back.

In Fig. 6 I show a modification of the headrest designated by the assembly numeral 50 in which there is a front fabric strip 51 with a vertical pocket 52 at each vertical edge and a flap 53 extending downwardly from the lower portion of the flap 51. A rear strip 54 is secured to the front strip, preferably by the stitching 55 used to form the pocket 52. This forms a sack structure which is open at the bottom 56 and also at the top 57. In use of the headrest arrangement of Fig. 6 the vertical pockets are fitted over the vertical posts 20, which posts may be entirely held in place by the socket structure on the seat back or may have the cross brace shown in Fig. 2. This construction provides sufficient slack between the front strip 51 and the rear strip 54 for insertion of a pillow, which pillow, if desired, may rest on the upper edge of the seat back. However, if a cross brace such as 21 is used, the pillow may be tucked between this brace and the lower portion of the front strip 51 at substantially its junction with the flap 53. Such flap fits over the front of the seat back.

It will be seen that in the form of the construction illustrated in Figs. 1, 5 and 6, that the fabric flap rests against the seat back. Therefore when a person leans against this flap and thus holds the flap pressed tightly against the seat back, that on account of the flap being attached to the head rest portion of the structure, the headrest is held in proper position as regards the user of the device.

Various changes may be made in the details of construction without departing from the spirit or scope of the invention as defined by the appended claims.

I claim:

1. In a device as described, a sack having front, back and end walls, and a bottom, and open at the top, vertical pockets at the ends, and means fitting in said pockets adapted to secure the sack on a seat back with the bottom resting on the upper edge of the seat back, a flap secured to the sack and depending over the front of the seat back.

2. In a device as described, a sack having sides, ends, and a bottom, and open at the top, a vertical pocket attached to each end, a vertical post in each pocket, and means to attach the post to a seat back to position the bottom of the sack resting on the upper edge of the seat back, a flap attached to the lower portion of the front side of the sack and depending over the front of the seat back, the side edges of the flap being in substantial alignment with the posts.

3. In a device as described, the combination of a seat back having an upper edge, a rear side, a front side, a pair of socket devices secured to the rear side, a pair of post brackets each having a substantially horizontal supporting portion resting on the top of the seat back, a lower end portion fitted in a socket device, a vertical post extending upwardly from the horizontal section, and a headrest means secured to the two posts, the headrest means comprising a sack having a pocket at each end in which one of the posts fits, said sack being open at the top adapted for insertion of a pillow, the bottom of the sack resting on the seat back.

4. In a device as described, the combination of a seat back having an upper edge, a rear side, a front side, a pair of socket devices secured to the rear side, a pair of post brackets each having a substantially horizontal supporting portion resting on the top of the seat back, a lower end portion fitted in a socket device, a vertical post extending upwardly from the horizontal portion, a headrest means secured to the two posts, the headrest means comprising a sack having a pocket at each end in which one of the posts fits, said sack being open at the top adapted for insertion of a pillow, the bottom of the sack resting on the seat back, and a flap secured to the front portion of the sack and its lower end and extending over the front portion of the seat back.

5. In a device as described, a headrest structure having fabric front and back walls, vertical pockets at the ends, means to fit in the pockets adapted to secure the headrest structure on a seat back, with the lower edges of the fabric adapted to engage the upper edge of the seat back, the front and back walls being separable at the top adapted for inserting a pillow between the front and back fabrics, and a flap secured to the front wall and depending over the front of the seat back.

6. In a device as described, a headrest structure having front and back fabric strips with a vertical pocket attached to each end, the strips being separable at the top between the pockets for insertion of a pillow, a vertical post in each pocket, and means to attach the post to a seat back so that the bottom edges of the front and back fabrics are adapted to engage the top of the seat back.

7. In a device as claimed in claim 6, the front fabric having a downwardly extending flap adapted to depend over the front of a seat back, the side edges of the flap being in substantial alignment with the posts.

HARRY E. PUMPHREY.